United States Patent
Bhardwaj et al.

(10) Patent No.: US 9,396,493 B2
(45) Date of Patent: Jul. 19, 2016

(54) SYSTEM AND METHOD FOR RECOMMENDING HOME DÉCOR ITEMS BASED ON AN IMAGE OF A ROOM

(71) Applicant: eBay Inc., San Jose, CA (US)

(72) Inventors: Anurag Bhardwaj, Sunnyvale, CA (US); Robinson Piramuthu, Oakland, CA (US); Neelakantan Sundaresan, Mountain View, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 14/073,721

(22) Filed: Nov. 6, 2013

(65) Prior Publication Data

US 2014/0289069 A1    Sep. 25, 2014

Related U.S. Application Data

(60) Provisional application No. 61/803,659, filed on Mar. 20, 2013.

(51) Int. Cl.
*G06Q 30/00* (2012.01)
*G06Q 30/06* (2012.01)

(52) U.S. Cl.
CPC .................... *G06Q 30/0631* (2013.01)

(58) Field of Classification Search
CPC ........................ G06Q 30/0601–30/08
USPC ................................ 705/26.1–27.2
See application file for complete search history.

(56) References Cited

U.S. PATENT DOCUMENTS

| | | | |
|---|---|---|---|
| 2010/0048242 A1* | 2/2010 | Rhoads et al. | 455/556.1 |
| 2012/0231424 A1* | 9/2012 | Calman et al. | 434/72 |
| 2013/0259308 A1* | 10/2013 | Klusza et al. | 382/103 |

FOREIGN PATENT DOCUMENTS

WO    WO 2013067550 A1 * 10/2013

OTHER PUBLICATIONS

V. Hedau, D. H., Forsyth, D.: Recovering the Spatial Layout of Cluttered Rooms. In: proc. ICCV. (2009).*

Lee, David C., Three Dimensional Representation and Reasoning for Indoor Scene Understanding, 2011.*

Comaniciu, Dorin, et al., "Mean Shift: A Robust Approach Toward Feature Space Analysis", IEEE Transactions on Pattern Analysis and Machine Intelligence, vol. 24, (May 2002), 603-619.

Gupta, Abhinav, et al., "From 3D Scene Geometry to Human Workspace", Proceedings of IEEE Conference on Computer Vision and Pattern Recognition, (2011), 1961-1968.

(Continued)

*Primary Examiner* — Ethan D Civan
*Assistant Examiner* — Brittney N Miller
(74) *Attorney, Agent, or Firm* — Schwegman, Lundberg & Woessner, P.A.

(57) ABSTRACT

A method, system, and article of manufacture for recommending items for a room. An image of a room is received, a box image is fitted to the image of the room. Information is extracted from the fitted box image and is used for recommending items for the room. The image is a color image and extracting information is done by extracting color histograms from the fitted box image. The color histograms are used to determine items that match the color scheme of the room, the lighting of the room, and/or the decorating style of the room.

10 Claims, 9 Drawing Sheets
(5 of 9 Drawing Sheet(s) Filed in Color)

(56) References Cited

OTHER PUBLICATIONS

Hedau, Varsha, et al., "Recovering Free Space of Indoor Scenes from a Single Image", Proceedings of IEEE Conference on Computer Vision and Pattern Recognition, (2012), 2807-2814.

Tardif, Jean-Philippe, "Non-Iterative Approach for Fast and Accurate Vanishing Point Detection", IEEE 12th International Conference on Computer Vision, (2009), 1250-1257.

Von Gioi, R. G, et al., "LSD: A Fast Line Segment Detector with a False Detection Control", IEEE Transactions on Pattern Analysis and Machine Intelligence, 32(4), (Apr. 2010), 722-732.

* cited by examiner

SYSTEM AND METHOD FOR RECOMMENDING HOME DÉCOR ITEMS BASED ON AN IMAGE OF A ROOM

CLAIM OF PRIORITY

This application claims the benefit of priority to U.S. Provisional Patent Application Ser. No. 61/803,659, filed on Mar. 20, 2013, which is incorporated by reference herein in its entirety.

TECHNICAL FIELD

The present invention relates generally to image recognition and uses of image data obtained from image recognition to recommend home décor items.

BACKGROUND

Images can be used to convey information more efficiently or in a way not possible with text, particularly from the viewpoint of a user capturing the images or to facilitate electronic commerce (e-commerce). Images may be used as queries to find matching items in an inventory. When the images are of a room, the complexity of information conveyed in the images make it difficult to accurately identify attributes relevant for finding matching items in the inventory, such as furniture, lighting, textiles, or other home décor items.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some embodiments are illustrated by way of example and not limitations in the figures of the accompanying drawings, in which.

The headings provided herein are for convenience only and do not necessarily affect the scope or meaning of the terms used.

DETAILED DESCRIPTION

Described in detail herein is an apparatus and method for providing recommendations of relevant home décor items in response to user submission of an image of a room. The image of the room is processed using a plurality of algorithms, including parsing the pictured room into planar components (e.g., walls, ceiling, floor). Color related properties for each identified planar component as well as the image as a whole are detected. A theme or style corresponding to the room or at least an item located in the room may also be detected as a property of the image. Such image properties are matched to home décor items in an inventory to identify recommendation of items that may be replacements or additions to items included in the image. As an example, a recommended item may match or complement a pictured item in color, pattern, texture, and/or theme/style.

Various modifications to the example embodiments will be readily apparent to those skilled in the art, and the generic principles defined herein may be applied to other embodiments and applications without departing from the scope of the invention. Moreover, in the following description, numerous details are set forth for the purpose of explanation. However, one of ordinary skill in the art will realize that the invention may be practiced without the use of these specific details. In other instances, well-known structures and processes are not shown in block diagram form in order not to obscure the description of the invention with unnecessary detail. Thus, the present disclosure is not intended to be limited to the embodiments shown, but is to be accorded the widest scope consistent with the principles and features disclosed herein.

Figure 1:
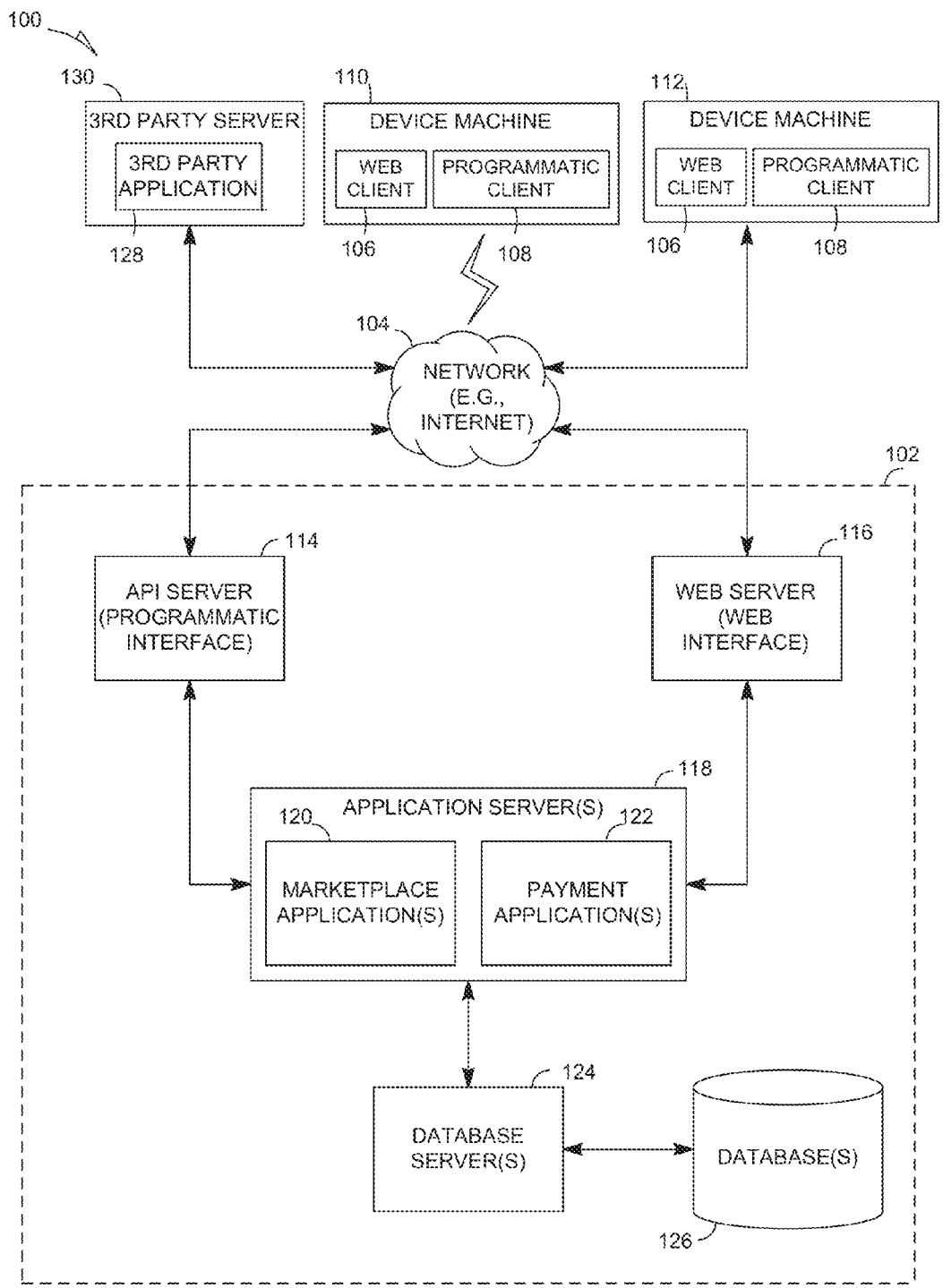
FIG. 1 illustrates a block diagram depicting a network architecture of a system, according to some embodiments, having a client-server architecture configured for exchanging data over a network.

FIG. 1 illustrates a network diagram depicting a network system 100, according to one embodiment, having a client-server architecture configured for exchanging data over a network. A networked system 102 forms a network-based publication system that provides server-side functionality, via a network 104 (e.g., the Internet or Wide Area Network (WAN)), to one or more clients and devices. FIG. 1 further illustrates, for example, one or both of a web client 106 (e.g., a web browser) and a programmatic client 108 executing on device machines 110 and 112. In one embodiment, the publication system 100 comprises a marketplace system. In another embodiment, the publication system 100 comprises other types of systems such as, but not limited to, a social networking system, a matching system, a recommendation system, an electronic commerce (e-commerce) system, a search system, and the like.

Each of the device machines 110, 112 comprises a computing device that includes at least a display and communication capabilities with the network 104 to access the networked system 102. The device machines 110, 112 comprise, but are not limited to, remote devices, work stations, computers, general purpose computers, Internet appliances, hand-held devices, wireless devices, portable devices, wearable computers, cellular or mobile phones, portable digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. Each of the device machines 110, 112 may connect with the network 104 via a wired or wireless connection. For example, one or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WAMax network, another type of network, or a combination of two or more such networks.

Each of the device machines 110, 112 includes one or more applications (also referred to as "apps") such as, but not limited to, a web browser, messaging application, electronic mail (email) application, an e-commerce site application (also referred to as a marketplace application), and the like. In some embodiments, if the e-commerce site application is included in a given one of the device machines 110, 112, then this application is configured to locally provide the user interface and at least some of the functionalities with the application configured to communicate with the networked system 102, on an as needed basis, for data and/or processing capabilities not locally available (such as access to a database of items available for sale, to authenticate a user, to verify a method of payment, etc.). Conversely if the e-commerce site application is not included in a given one of the device machines 110, 112, the given one of the device machines 110, 112 may use its web browser to access the e-commerce site (or a variant thereof) hosted on the networked system 102. Although two device machines 110, 112 are shown in FIG. 1, more or less than two device machines can be included in the system 100.

An Application Program Interface (API) server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more databases servers 124 that facilitate access to one or more databases 126.

The marketplace applications 120 may provide a number of e-commerce functions and services to users that access networked system 102. E-commerce functions/services may include a number of publisher functions and services (e.g., search, listing, content viewing, payment, etc.). For example, the marketplace applications 120 may provide a number of services and functions to users for listing goods and/or services or offers for goods and/or services for sale, searching for goods and services, facilitating transactions, and reviewing and providing feedback about transactions and associated users. Additionally, the marketplace applications 120 may track and store data and metadata relating to listings, transactions, and user interactions. In some embodiments, the marketplace applications 120 may publish or otherwise provide access to content items stored in application servers 118 or databases 126 accessible to the application servers 118 and/or the database servers 124. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products or items (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102. In other embodiments, the payment applications 122 may be omitted from the system 100. In some embodiments, at least a portion of the marketplace applications 120 may be provided on the device machines 110 and/or 112.

Further, while the system 100 shown in FIG. 1 employs a client-server architecture, embodiments of the present disclosure is not limited to such an architecture, and may equally well find application in, for example, a distributed or peer-to-peer architecture system. The various marketplace and payment applications 120 and 122 may also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace, or payment functions that are supported by the relevant applications of the networked system 102.

Figure 2:
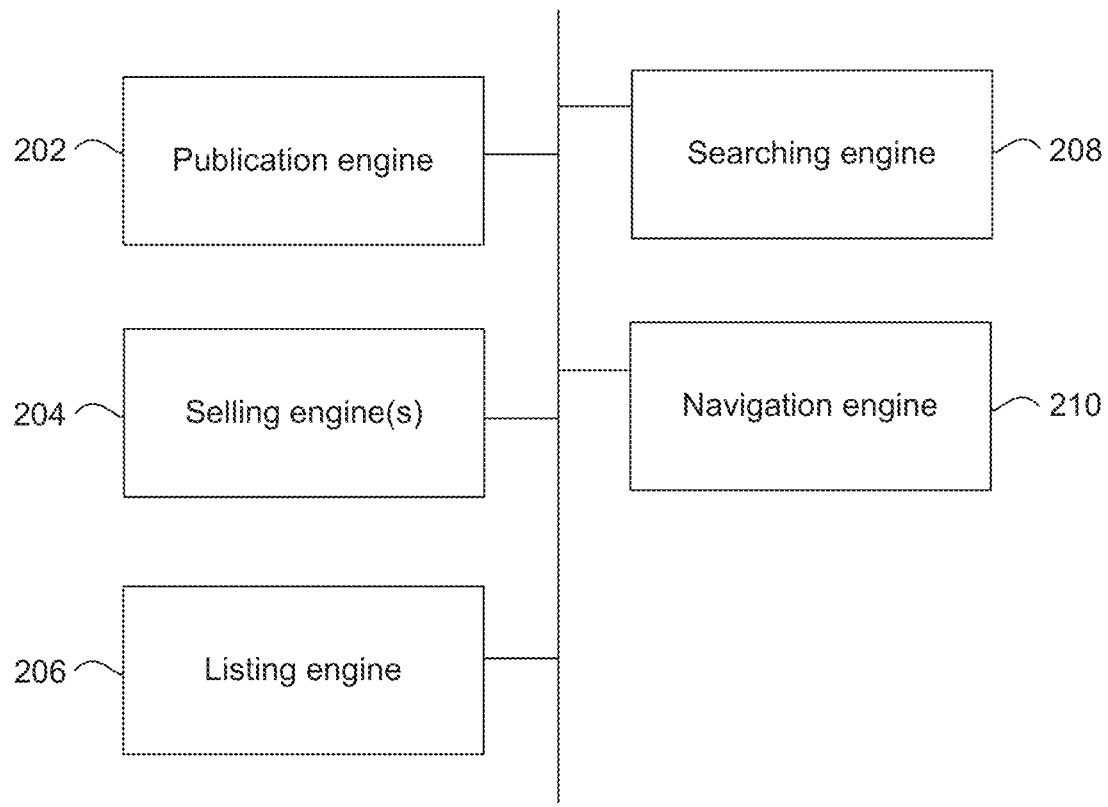
FIG. 2 illustrates a block diagram showing components provided within the system of FIG. 1 according to some embodiments.

FIG. 2 illustrates a block diagram showing components provided within the networked system 102 according to some embodiments. The networked system 102 may be hosted on dedicated or shared server machines (not shown) that are communicatively coupled to enable communications between server machines. The components themselves are communicatively coupled (e.g., via appropriate interfaces) to each other and to various data sources, on as to allow information to be passed between the applications or so as to allow the applications to share and access common data. Furthermore, the components may access one or more databases 126 via the database servers 124.

The networked system 102 may provide a number of publishing, listing, and/or price-setting mechanisms whereby a seller (also referred to as a first user) may list (or publish information concerning) goods or services for sale or barter, a buyer (also referred to as a second user) can express interest in or indicate a desire to purchase or barter such goods or services, and a transaction (such as a trade) may be completed pertaining to the goods or services. To this end, the networked system 102 may comprise at least one publication engine 202 and one or more selling engines 204. The publication engine 202 may publish information, such as item listings or product description pages, on the networked system 102. In some embodiments, the selling engines 204 may comprise one or more fixed-price engines that support fixed-price listing and price setting mechanisms and one or more auction engines that support auction-format listing and price setting mechanisms (e.g., English, Dutch, Chinese, Double, Reverse auctions, etc.). The various auction engines may also provide a number of features in support of these auction-format listings, such as a reserve price feature whereby a seller may specify a reserve price in connection with a listing and a proxy-bidding feature whereby a bidder may invoke automated proxy bidding. The selling engines 204 may further comprise one or more deal engines that support merchant-generated offers for products and services.

A listing engine 206 allows sellers to conveniently author listings of items or authors to author publications. In one embodiment, the listings pertain to goods or services that a user (e.g., a seller) wishes to transact via the networked system 102. In some embodiments, the listings may be an offer, deal, coupon, or discount for the good or service. Each good or service is associated with a particular category. The listing engine 206 may receive listing data such as title, description, and aspect name/value pairs. Furthermore, each listing for a good or service may be assigned an item identifier. In other embodiments, a user may create a listing that is an advertisement or other form of information publication. The listing information may then be stored to one or more storage devices coupled to the networked system 102 (e.g., databases 126). Listings also may comprise product description pages that display a product and information (e.g., product title, specifications, and reviews) associated with the product. In some embodiments, the product description page may include an aggregation of item listings that correspond to the product described on the product description page.

The listing engine 206 also may allow buyers to conveniently author listings or requests for items desired to be purchased. In some embodiments, the listings may pertain to goods or services that a user (e.g., a buyer) wishes to transact via the networked system 102. Each good or service is associated with a particular category. The listing engine 206 may receive as much or as little listing data, such as title, description, and aspect name/value pairs, that the buyer is aware of about the requested item. In some embodiments, the listing engine 206 may parse the buyer's submitted item information and may complete incomplete portions of the listing. For example, if the buyer provides a brief description of a requested item, the listing engine 206 may parse the description, extract key terms and use those terms to make a determination of the identity of the item. Using the determined item identity, the listing engine 206 may retrieve additional item details for inclusion in the buyer item request. In some embodiments, the listing engine 206 may assign an item identifier to each listing for a good or service.

In some embodiments, the listing engine 206 allows sellers to generate offers for discounts on products or services. The listing engine 206 may receive listing data, such as the product or service being offered, a price and/or discount for the product or service, a time period for which the offer is valid, and so forth. In some embodiments, the listing engine 206 permits sellers to generate offers from the sellers' mobile devices. The generated offers may be uploaded to the networked system 102 for storage and tracking.

Searching the networked system 102 is facilitated by a searching engine 208. For example, the searching engine 208 enables keyword queries of listings published via the networked system 102. In example embodiments, the searching engine 208 receives the keyword queries from a device of a user and conducts a review of the storage device storing the listing information. The review will enable compilation of a result set of listings that may be sorted and returned to the client device (e.g., device machine 110, 112) of the user. The searching engine 208 may record the query (e.g., keywords) and any subsequent user actions and behaviors (e.g., navigations, selections, or click-throughs).

The searching engine 208 also may perform a search based on a location of the user. A user may access the searching engine 208 via a mobile device and generate a search query. Using the search query and the user's location, the searching engine 208 may return relevant search results for products, services, offers, auctions, and so forth to the user. The searching engine 208 may identify relevant search results both in a list form and graphically on a map. Selection of a graphical indicator on the map may provide additional details regarding the selected search result. In some embodiments, the user may specify, as part of the search query, a radius or distance from the user's current location to limit search results.

The searching engine 208 also may perform a search based on an image. The image may be taken from a camera or imaging component of a client device or may be accessed from storage.

In a further example, a navigation engine 210 allows users to navigate through various categories, catalogs, or inventory data structures according to which listings may be classified within the networked system 102. For example, the navigation engine 210 allows a user to successively navigate down a category tree comprising a hierarchy of categories (e.g., the category tree structure) until a particular set of listing is reached. Various other navigation applications within the navigation engine 210 may be provided to supplement the searching and browsing applications. The navigation engine 210 may record the various user actions (e.g., clicks) performed by the user in order to navigate down the category tree.

Additional modules and engines associated with the networked system 102 are described below in further detail. It should be appreciated that modules or engines may embody various aspects of the details described below. For instance, an image analysis engine may be included in the networked system 102 to extract home décor properties from an image of a room. The extracted home décor properties may then be used by a home décor engine or home décor recommendation engine (e.g., included in the networked system 102 or client machines 110 or 112) to provide a user recommendations of relevant home décor items in an inventory.

Choice of color, pattern, and material are relevant in home décor. There are numerous possibilities for items to be included in a room. Hence it is cumbersome for a user interested in home décor to become knowledgeable about a large number of potential home décor items or different combinations of home décor items for a room. Embodiments of the present disclosure provide recommendations of home décor items in an inventory that are relevant relative to an image of a room submitted by a user. In one embodiment, a user may upload an image or picture of a room, along with identification a room type, such as a living room, bedroom or office. The room image may be parsed into planar regions such as a floor, walls, and a ceiling, using well known means. Color distribution, patterns, and region properties may be extracted from each macro plane of the room image. Technology for extracting color distribution, patterns, and region properties may be seen U.S. patent application Ser. No. 13/631,833 filed on Sep. 28, 2012, entitled "Extraction of Image Feature Data from Images" which is herein incorporated by reference in its entirety. Extracted properties give rich information such as matching colors and patterns, degree of clutter, location of structural features (e.g., doors, windows, and framed objects on wall), shiny objects, locations of furniture on the floor, and the like. This information may then be used to recommend replacement items or new items for the given room.

Examples discussed in the present disclosure pertain to living rooms. However, the proposed approach is applicable to other rooms such as kitchens, bedrooms, bathrooms, offices, family rooms, hobby rooms, garages, sheds, sun rooms, playrooms, man caves, walk-in closets, exercise rooms, libraries, studies, cubicles, or other defined area or room within a building. The given room may be assumed to have a shape of a box (e.g., cuboid). However, slight variations from a box shape to account for features such as attic ceilings, dormers, sloped ceilings, curved walls, etc., may be contemplated.

Item types and item material may depend on where an item may be suitable within a room. For example, a ceiling fan belongs on a ceiling. It is usually made of metal or plastic and may include a light source. As additional examples, large furniture belongs on the floor, large framed objects belong on the walls, and doors and windows belong on the walls (with the exception of skylight windows on the ceiling).

The recommendation mechanism parses the room into a floor, walls, and a ceiling, and approximates each of them by a plane. In one embodiment, color histograms, seen in FIG. 3, may be extracted for the room. As examples, seen generally as 300, images of rooms 310, 320, 330, and 340 each have different color palettes. Each of the above room images has a respective histogram immediately below it that illustrates color information extracted from the image of the room, with the colors as indicated in the histogram metrics. Items may be recommended having the same color palette as the room. In other embodiments, additional information about the room may be used to determine matching items—information about properties of items in the room and/or geometric properties of the room.

Room geometry may be used to parse the room into a union of disjoint planes, and then each plane may be classified as a floor, wall, or ceiling. To achieve this, the first step is line detection. A line detection algorithm, such as described in "*LSD: A Fast Line Segment Detector with a False Detection Control*", R. G. von Gioi, Jakubowicz, J. M. Morel, G. Randall, IEEE Transactions on Pattern Analysis and Machine Intelligence (PAMI), vol. 32, pp. 722-732, April, 2010, may be used to detect line segments. Alternatively, edge map detection may be used using a standard Canny edge detector and then approximating the edge map by polylines.

The input image of the room may be assumed to have at least three planes in view. For example, a ceiling and two walls, or a ceiling, a wall, and a floor. A camera used to capture the image may be assumed to be linear with no spherical distortions. The image may also be assumed to be oriented naturally. Since the room may be assumed to be a box (or nearly a box), the boundaries of the planes in the image are assumed to produce vanishing points. Planes of the room are determined based on the detected line segments, and in particular, the orientation of the detected lined segments. Based on analysis of the intersection of lines, they are grouped and vanishing points are detected. There are various ways to detect vanishing points. An example method for detecting vanishing points is described in "*Non-iterative Approach for Fast and Accurate Vanishing Point Detection*", J. P. Tardif, IEEE International Conference on Computer Vision (ICCV, pp. 1250-1257), 2009. The line segments are grouped based on corresponding vanishing points. The intersecting planes are detected based on these grouped lines.

Embodiments of the present disclosure implement image recognition or construct approaches of fitting a box to a room in order to extract information about items in the room, which in turn may be used to determine recommendation of replacement or additional items for items already in the room. Examples of image recognition or construct approaches for fitting a box to a room are provided in "*From 3D scene geometry to human workspace*", A. Gupta, S. Satkin, A. A, Efros, M. Hebert, Proceedings of IEEE Conference on Computer Vision and Pattern Recognition (CVPR), pp. 1961-1968, 2011 and "*Recovering Free Space of Indoor Scenes from a Single Image*", V. Hedau, D. Hoiem, D. Forsyth, Proceedings of IEEE Conference on Computer Vision and Pattern Recognition (CVPR), pp. 2807-2814, 2012.

Figure 3:
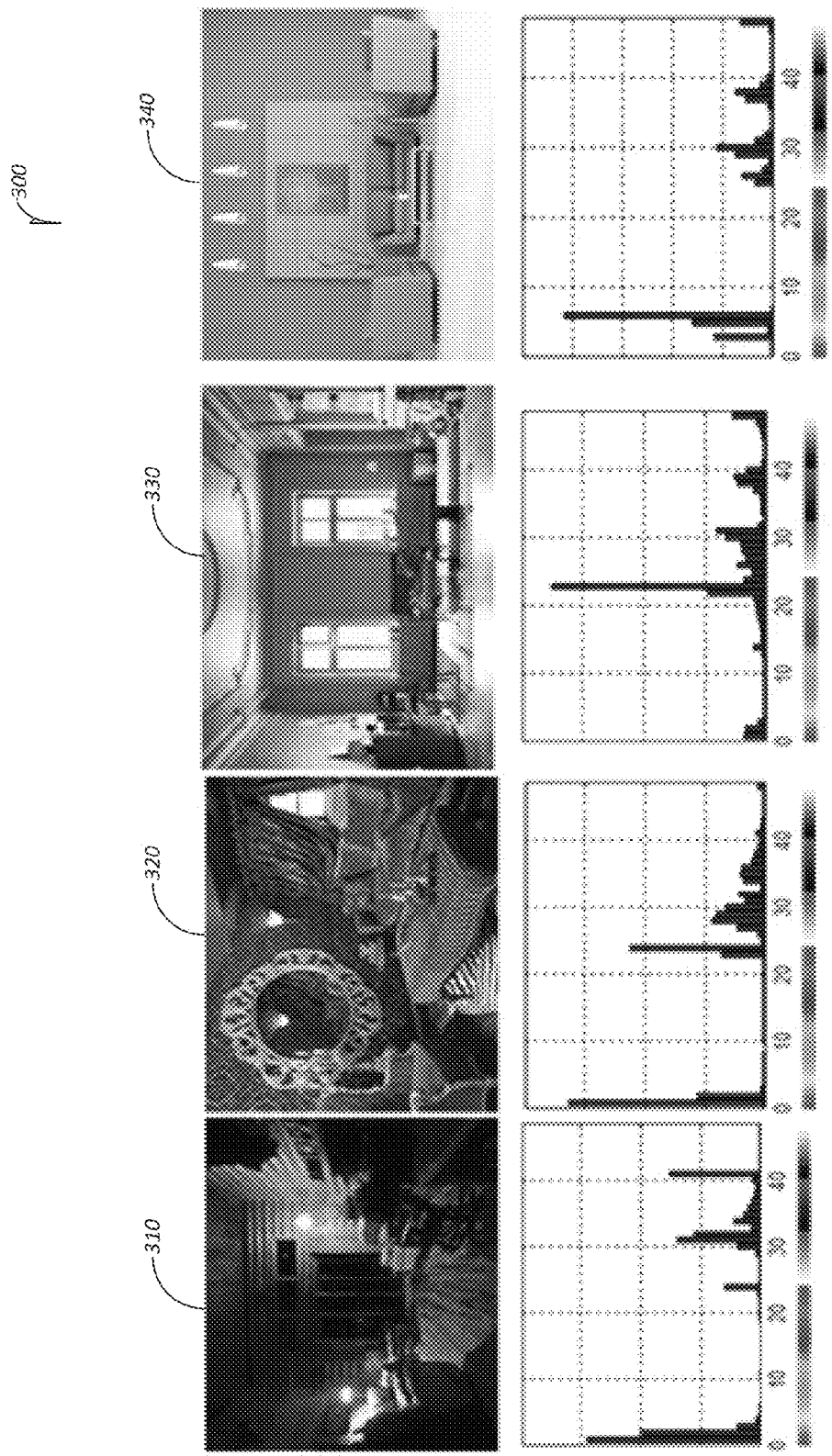
FIG. 3 illustrates extracted color histograms for example images of a plurality of living rooms according to some embodiments.

Continuing with reference to FIG. 3, extracted color histograms are illustrated for a plurality of living rooms accomplished in accordance with the above referenced technology. Note that the living rooms differ from each other in camera angle, color schemes, lighting, and/or decorating styles. FIG. 3 illustrates the extracted color theme (or color histogram) for various living rooms. The color distribution may be weighted histogram with 48 bins as represented by the horizontal axis). There are, in one embodiment, 24, 8, 8 bins for hue, saturation, value of color pixels, respectively, and 8 bins for gray pixels. The illustrated living rooms have very few dominating hues. In general, this is not very useful alone to capture properties of items to be recommended. Parsing the room into floor, wall, and ceiling and then extracting item properties provides more information for finding item recommendations.

Figure 4:
FIG. 4 illustrates an example process for parsing a room into basic planar components, namely a floor, walls, and a ceiling according to some embodiments.

FIG. 4 illustrates an example process of parsing a room into basic planar components, namely a floor, walls, and a ceiling. The scene in FIG. 4 comprises pictures of a living room, as shown in the first (leftmost) column. Lines are detected (see second column). Vanishing points are detected based on the detected lines (see third column). Lines shown in the third column are colored based on the vanishing point they correspond to. Only lines corresponding to the top three vanishing points are shown in the illustration. Depending on the position and direction of the contributing lines, and assuming that the room has the shape of a box, intersecting planes are detected and are classified as a wall, ceiling, or floor (see fourth column).

Figure 5:
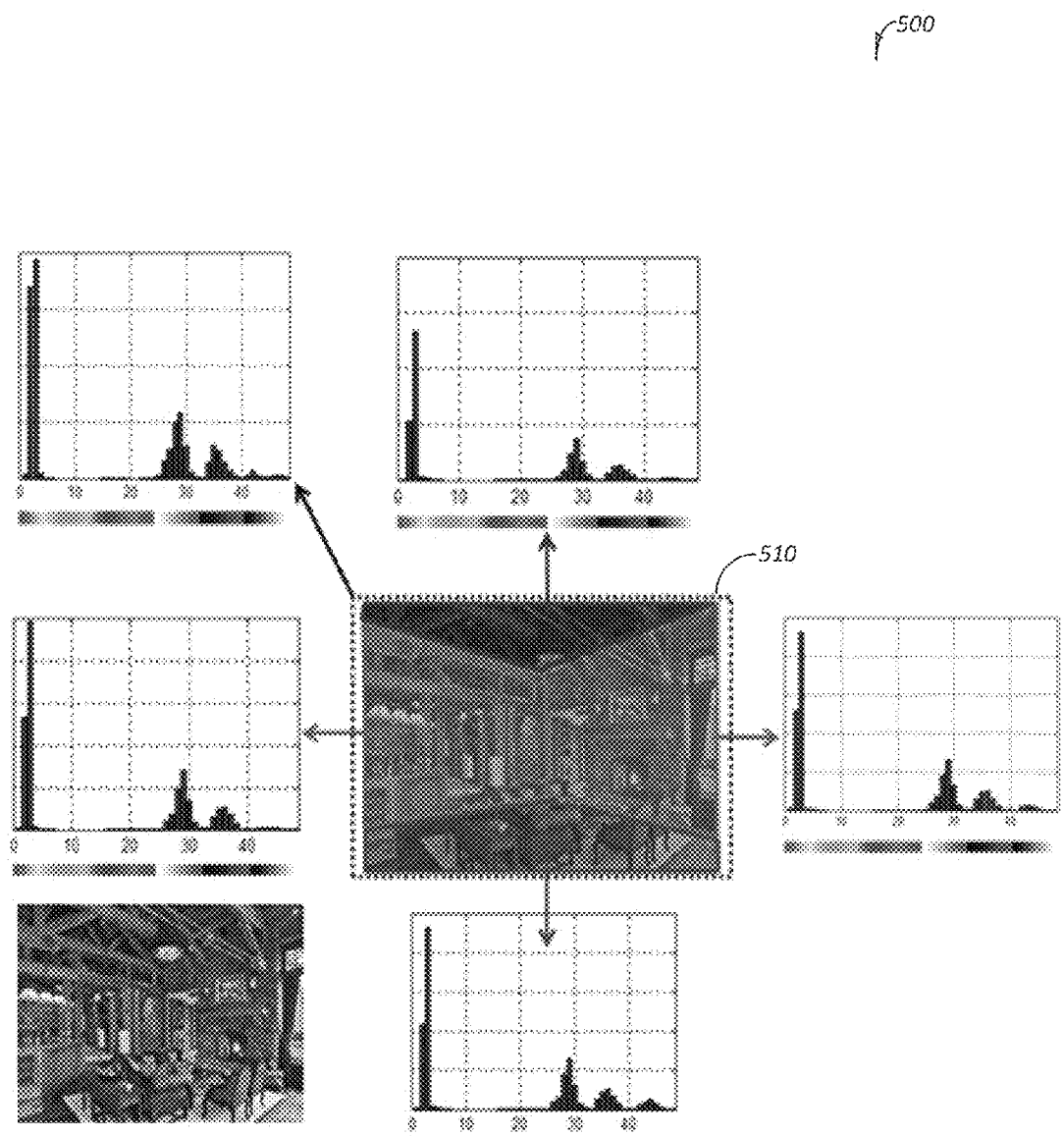
FIG. 5 illustrates an example of properties extracted from an image of a room according to some embodiments.
Figure 6:
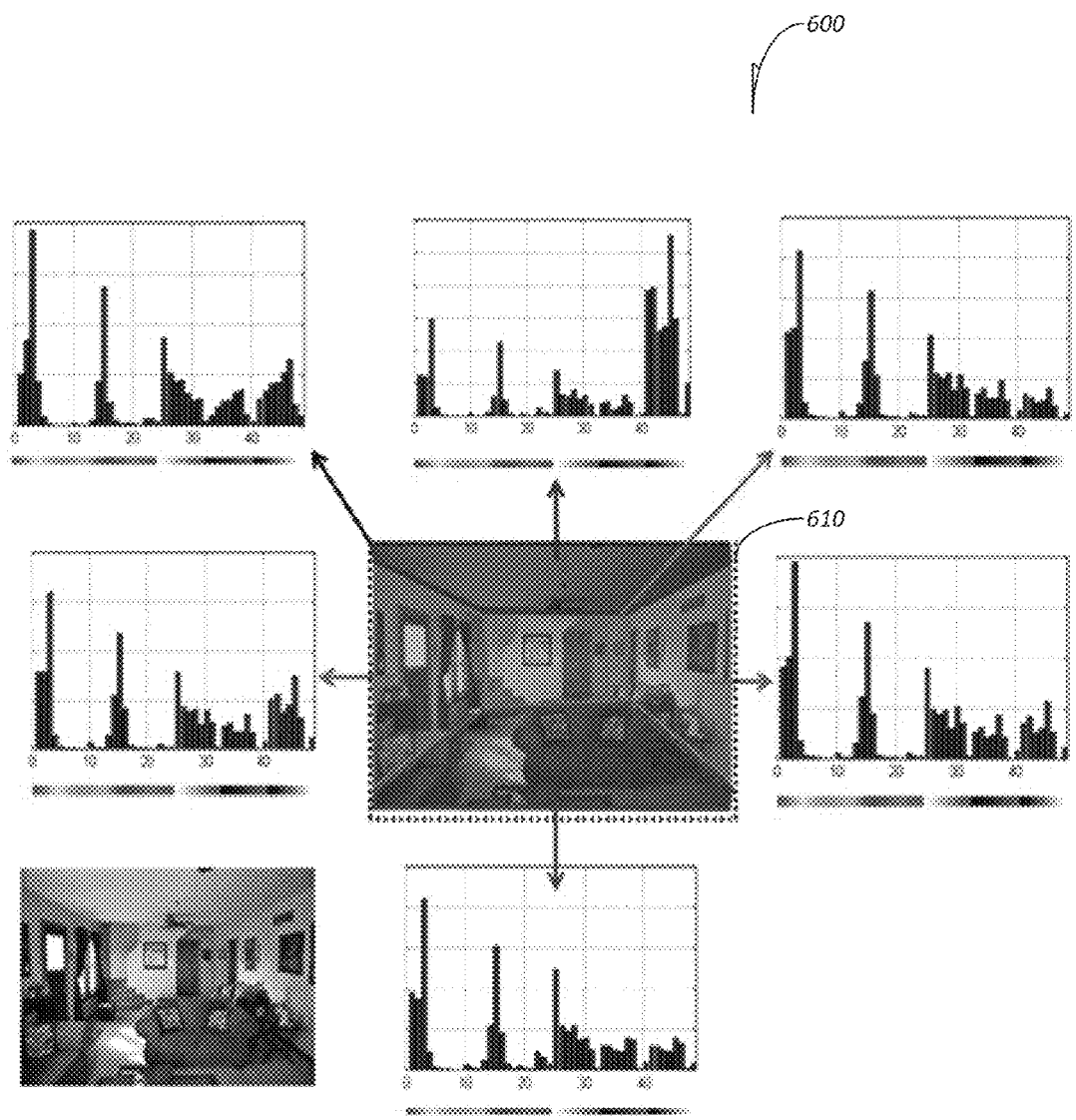
FIG. 6 illustrates another example of properties extracted from an image of a different room according to some embodiments.

As discussed above, specific items may be associated with each planar component. Detected line segments may be reused to detect beams in the ceiling, large framed objects on the wall and doors, and/or windows on the wall. Weak pattern information may be extracted using the distribution of orientation of the gradient in the image, weighted by the magnitude of the gradient. Regions may be extracted from each planar component using a mean shift algorithm such as described in "*Mean shift: A robust approach toward feature space analysis*", D. Comanicu, P. Meer, IEEE Trans. Pattern Anal. Machine Intelligence (PAMI), vol. 24, pp. 603-619, May 2002. The size of regions with respect to that of the room may be used to classify objects based on size. For example, the largest object on the floor may likely be a couch or sofa. Region segmentation may also be used to measure clutter of objects in each planar component. Note that small regions from region segmentation are ignored since they are more likely to arise from fine textures (e.g., carpet). FIGS. 5 and 6 illustrate color signatures extracted from the detected planar components. Example methodologies for obtaining color signatures are described in the above U.S. patent application Ser. No. 13/631,833. Note that the background of walls and ceilings are assumed to represent wall paint (or wallpaper or natural wood) and the background of a floor may be assumed to be carpet or wood or tile. Background comprises a union of regions that are connected and may be regarded as not salient. It is not necessary to extract the complete set of background regions. It is sufficient to get representative samples. An one embodiment, representative background samples for the walls are taken closer to the ceiling. Representative background samples for the ceiling are taken close to the periphery of the ceiling. Representative background samples for the floor are taken based on density of clutter of regions. The extracted information may be structured and used to retrieve items for recommendation.

To describe FIG. 5 in additional detail, properties of the scene are extracted. In this case, and as seen from the histograms, color signature may be extracted. Color signatures are extracted for the entire image as well as each detected plane (left/right walls, ceiling, and floor). Note from the histograms that all signatures are similar to each other (e.g., in color distribution) and the hue is close to orange with medium saturation and value. This is an indication that the room has a rustic look with natural wood and stones. Items recommended for the room may then be those that are considered rustic and have the color of natural wood. Examples include tan leather couch, wooden furniture, and paintings with muted colors. Color variations within each plane are also measured. This gives an indication of materials used in each zone, namely floor, side walls, and ceiling. In this example, the ceiling is not smooth and has several straight lines. This indicates that the room has wooden frames in the ceiling. When applied to the floor, there are several dominant regions. This implies that the room is cluttered.

In FIG. 6, color signatures of a room 610 are extracted from the entire image as well as the detected planes, as indicated by the histograms, similar as was done in FIG. 5. The side walls have similar signatures, indicating that they have similar colors. Bright areas in the wall planes indicate a source of light. Shape, color, and size of region of bright areas can be used to classify the source as natural or artificial light. Regions of natural light are classified as doors or windows, based on relative size with respect to the wall. In this example, the ceiling has large regions, indicate that there may no clutter. Long non-vertical structures in the vicinity of doors and windows are classified as curtains. Large rectangular regions on walls, that are not light sources, are classified as framed art works or photographs. Clutter in the floor planar component may be classified as furniture. Size of these regions with respect to the size of room can be used to roughly classify into different types of furniture. The largest furniture in the living room is usually the sofa or couch. Items with thin almost-vertical structures are usually chairs or tables. Color signatures from extracted planes are slightly different from the global signature, indicating that these planes contain a similar color palette. Items recommended for each plane will be matched to those from the color signature of the corresponding plane.

Figure 7:
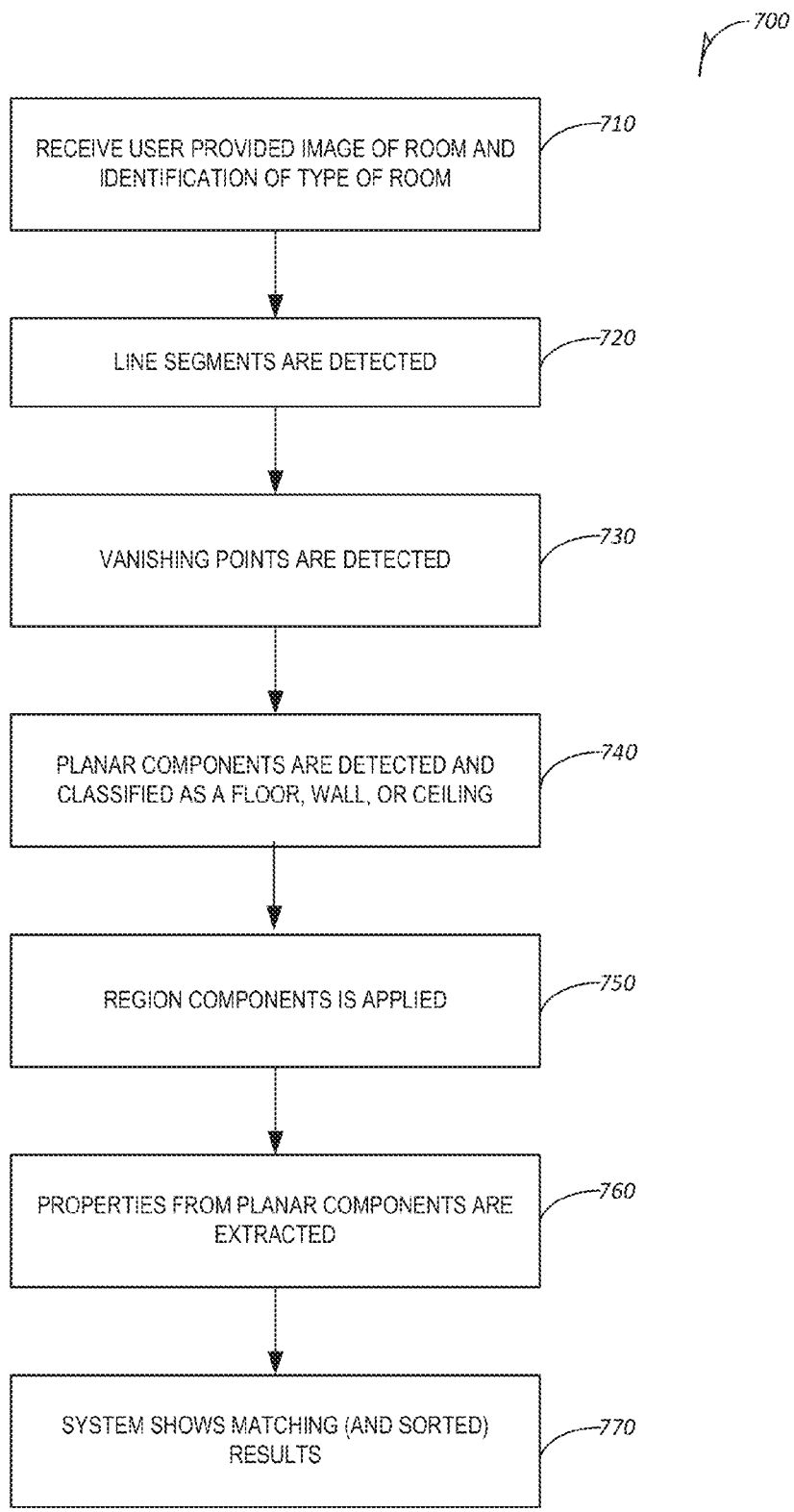
FIG. 7 illustrates an example process flow chart for determining and providing recommendations of replacement or additional items to a user based on a user provided image of a room and indication of type of room according to some embodiments.

FIG. 7 illustrates an example process flow chart 700 for determining and providing recommendations of replacement or additional items to a user based on a user provided image of a room and indication of type of room (e.g., living room, bedroom, etc.). At 710 the system receives a user provided image of a room and the identification of the type of room. At 720 line segments are detected as discussed above. At 730 vanishing points are detected. At 740 planar components are detected and classified as a floor, wall, or ceiling. At 750 region segmentation is applied and at 760 properties from planar components are extracted. Then at 770 the system shows matching and sorted results which may be presented to the user as recommendations.

Figure 8:
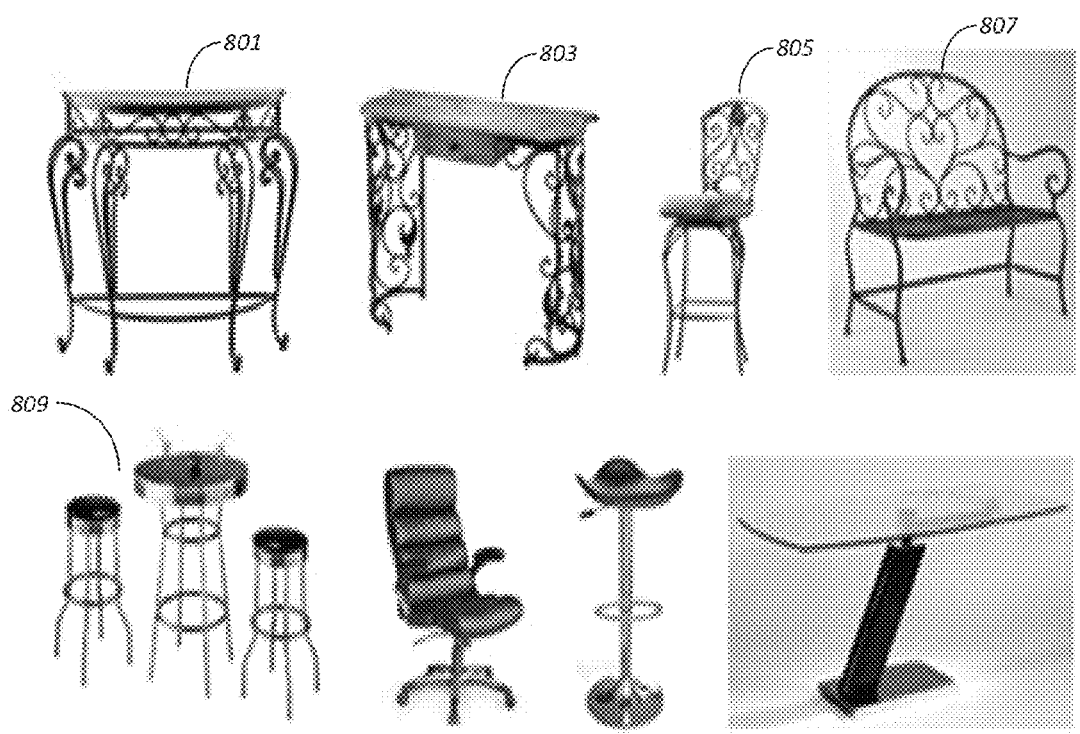
FIG. 8 illustrates example detection of themes or styles within images according to some embodiments.

During determination of room properties, such determination may include, in some embodiments, detection of a decorating theme or style of the room or items in the room. For example, the room and/or items in the room may have a modern, Art Deco, mid-century modern, industrial, Victorian, Renaissance, Colonial American, French, Italian, Asian, metal scrollwork, or other decorating theme. FIG. 8 illustrates examples pertaining to detection of a decorating theme. The leftmost image may be used as the "seed" to retrieve the remaining three images on the right. Both color and pattern signatures for the leftmost image are used to find matches. Note that all items in each row have a common theme. For example, the first image 801 in the top row is of Baroque style. The first image 809 in the bottom row is modern. Typically, it is considered good aesthetics if all furniture items in a single room have the same style. Given a baroque console table 801, it may be desirable to recommend a baroque table, 803, chair, 805, and bench 807. Hence the recommendations in the first row may make a good recommendation of a set of furniture. The same applies for the bottom row where items that belong to modern style may be recommended.

In some embodiments, items in an inventory (e.g., items listed for sale) may be grouped together based on which planar component they belong to. For example, items used on ceilings (e.g., ceiling fans, ceiling tights) may be grouped separately from items used on walls (e.g., wall sconces, picture frames, paintings and prints, mirrors) or items used on floors (e.g., rugs, furniture, floor lamps). Color signatures are extracted for each inventory item. This implicitly extracts themes as illustrated in FIG. 8. Note that most of the geometric analysis is done on the query image since the inventory is assumed to comprise images of individual items and not images of rooms with items.

Accordingly, embodiments of the recommendation mechanism provide automatic parsing of an image of an interior of a room into planar components (e.g., floor, wall, ceiling), and extracts information associated with the planar components. Items in inventory may be recommended based on their intended placement in a room matching the planar components corresponding to the image. Items in inventory may also be recommended based on one or more themes extracted from the image.

In some embodiments, the user may upload a video of a room instead of an image of the room. In this case the recommendation mechanism may treat the received video as a series of images and perform operations as discussed above.

Figure 9:
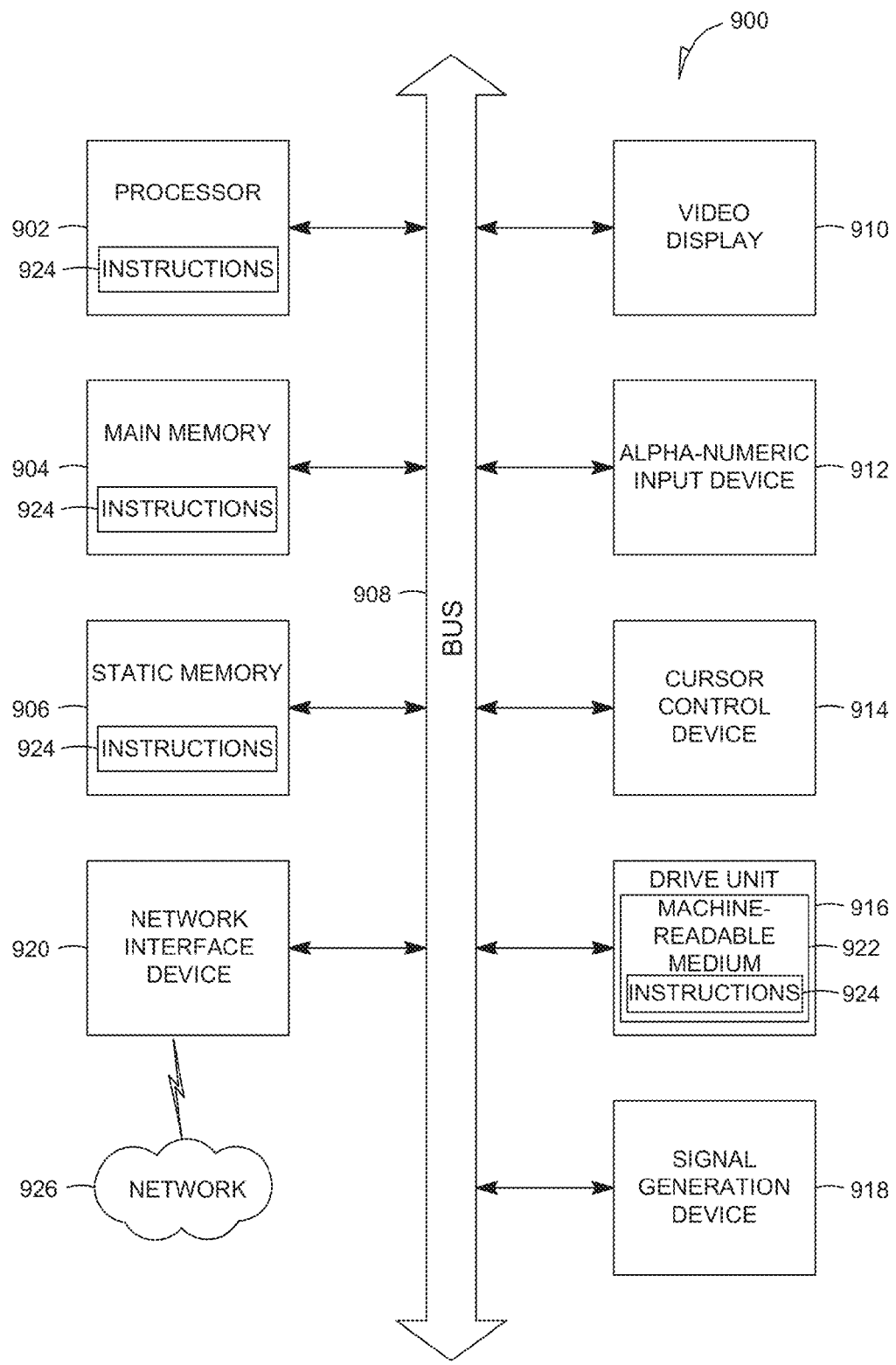
FIG. 9 illustrates a diagrammatic representation of a machine in example form of a computer system within which a set of instructions may be executed to cause the machine to perform any one or more of the methodologies discussed herein.

FIG. 9 shows a diagrammatic representation of a machine in the example form of a computer system 900 within which a set of instructions, for causing the machine to perform any one or more of the methodologies discussed herein, may be executed. The computer system 900 comprises, for example, any of the device machine 110, device machine 112, applications servers 118, API server 114, web server 116, database servers 124, or third party server 130. In alternative embodiments, the machine operates as a standalone device or may be connected (e.g., networked) to other machines. In a networked deployment, the machine may operate in the capacity of a server or a device machine in server-client network environment, or as a peer machine in a peer-to-peer (or distributed) network environment. The machine may be a server computer, a client computer, a personal computer (PC), a tablet, a set-top box (STB), a Personal Digital Assistant (PDA), a smart phone, a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU), or both), a main memory 904 and a static memory 906, which communicate with each other via a bus 908. The computer system 900 may further include a video display unit 910 (e.g., crystal display (LCD), organic light emitting diode (OLED), touch screen, or a cathode ray tube (CRT)). The computer system 900 also includes an alphanumeric input device 912 (e.g., a physical or virtual keyboard), a cursor control device 914 (e.g., a mouse, a touch screen, a touchpad, a trackball, a trackpad), a disk drive unit 916, a signal generation device 918 (e.g., a speaker) and a network interface device 920.

The disk drive unit 916 includes a machine-readable medium 922 on which is stored one or more sets of instructions 924 (e.g., software) embodying any one or more of the methodologies or functions described herein. The instructions 924 may also reside, completely or at least partially, within the main memory 904 and/or within the processor 902 during execution thereof by the computer system 900, the main memory 904 and the processor 902 also constituting machine-readable media.

The instructions 924 may further be transmitted or received over a network 926 via the network interface device 920.

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

It will be appreciated that, for clarity purposes, the above description describes some embodiments with reference to different functional units or processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), non-transitory, or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Although the present invention has been described in connection with some embodiments, it is not intended to be limited to the specific form set forth herein. One skilled in the art would recognize that various features of the described embodiments may be combined in accordance with the invention. Moreover, it will be appreciated that various modifications and alterations may be made by those skilled in the art without departing from the scope of the invention.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

References incorporated by reference herein in their entirety are:

"*Mean shift: A robust approach toward feature space analysis*", D. Comanicu, P. Meer, IEEE Trans. Pattern Anal. Machine Intelligence (PAMI), vol. 24, pp. 603-619, May 2002;

"*Non-iterative Approach for Fast and Accurate Vanishing Point Detection*", J.-P. Tardif, IEEE International Conference on Computer Vision (ICCV, pp. 1250-1257), 2009.

"*LSD: A Fast Line Segment Detector with a False Detection Control*", R. G. von Gioi, J. Jaktibowicz, J. M. Morel, G. Randall, IEEE Transactions on Pattern Analysis and Machine Intelligence (PAMI), vol. 32, pp. 722-732, April, 2010;

"*From 3D scene geometry to human workspace*", A. Gupta, S. Satkin, A. A. Efros, M. Hebert, Proceedings of IEEE Conference on Computer Vision and Pattern Recognition (CVPR), pp. 1961-1968, 2011; and "*Recovering Free Space of Indoor Scenes from a Single Image*", V. Hedau, D. Hoiem, D. Forsyth, Proceedings of IEEE Conference on Computer Vision and Pattern Recognition (CVPR), pp. 2807-2814, 2012.

What is claimed is:

1. A method of recommending décor items in a networked system comprising:
receiving, from a user interface via a wireless communication channel, a color image of a room from a camera device, the camera device sampling the image to provide an image comprising a plurality of pixels;
receiving, from the user interface via the wireless communication channel, an identification of a type of the room;
fitting a box to the image of the room;
using the fitted box, detecting line segments of the room;
based on analyzing an intersection of the detected line segments, grouping the line segments to detect vanishing points of the line segments;
using the vanishing points to detect intersecting planes of the image of the room and classifying respective ones of the detected planes as one of wall, ceiling or floor;
extracting a color signature and a pattern signature from the image of the room and the detected planes, the color signature providing information about one of the type of the room, the look of the room or the construction materials of the room, and the pattern signature providing information about items used on ceilings, items used on walls and items used on floors; and
using the provided information, recommending décor items for the room, via the wireless communication channel.

2. The method of claim 1 wherein fitting the box comprises using a geometry of the room.

3. The method of claim 2 wherein using the geometry of the room comprises parsing the image of the room into a union of disjoint planes.

4. The method of claim 2 further comprising using the color signature to determine items that match one of the color scheme of the room, the lighting of the room, or the decorating style of the room.

5. A system for recommending decor items over a network comprising:
at least one hardware processor configured to include:
a receiver module to receive, from a user interface via a wireless communication channel, a color image of a room from a camera device, the camera device sampling the image to provide an image comprising a plurality of pixels, the receiver module also to receive, from the user interface via the wireless communication channel, an identification of the room;
a box fitting module to fit a box to the image of the room;
a detection module for using the fitted box to detect line segments of the room;
an analysis module for analyzing an intersection of the detected line segments and grouping the detected line segments to detect vanishing points of the line segments;
using the vanishing points to detect intersecting planes of the image of the room and classifying respective ones of the detected planes as one of wall, ceiling or floor;
an extraction module for extracting a color signature and a pattern signature from the image of the room and the detected planes, the color signature providing information about cue of the type of the room, the look of the room or the construction materials of the room, and the pattern signature providing information about items used on ceilings, items used on walls and items used on floors; and
a recommendation module responsive to the information, for recommending decor items for the room via the wireless communication channel.

6. The system of claim 5, wherein the at least one hardware processor is further configured to include a fitting module to fit the box by using geometry of the room.

7. The system of claim 6 wherein using the geometry of the room comprises parsing the image of the room into a union of disjoint planes.

8. The system of claim 5, wherein the at least one hardware processor is further configured to include a color analysis module to analyze the color signature to determine items that match one of color scheme of the room, lighting of the room, or decorating style of the room.

9. The system of claim 5, wherein the color signature further provides information about color or lighting.

10. One or more non-transitory computer-readable mediums having embedded therein a set of instructions which, when executed by one or more processors of a computer, cause the computer to execute operations comprising:
receiving, from a user interface via a wireless communication channel, a color image of a room from a camera device, the camera device sampling the image to provide an image comprising a plurality of pixels;
receiving, from the user interface via the wireless communication channel, an identification of a type of the room;
fitting a box to the image of the room;
using the fitted box, detecting line segments of the room;
based on analyzing an intersection of detected line segments, grouping the line segments to detect vanishing points of the detected line segments;
using the vanishing points to detect intersecting planes of the image of the room and classifying respective ones of the detected planes as one of wall, ceiling or floor;
extracting a color signature and a pattern signature from the image of the room and individual ones of the detected planes, the color signature providing information about one of the type of the room, the look of the room or the construction materials of the room, and the pattern signature providing information about items used on ceilings, items used on walls, and items used on floors; and using the extracted information, recommending decor items for the room via the wireless communication channel.

\* \* \* \* \*